(12) United States Patent
Jang

(10) Patent No.: US 8,421,402 B2
(45) Date of Patent: Apr. 16, 2013

(54) METHOD AND APPARATUS FOR PROVIDING CHARGING INFORMATION REGARDING PORTABLE TERMINAL WITH SOLAR CELL

(75) Inventor: Jin Yeoul Jang, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 320 days.

(21) Appl. No.: 12/777,781

(22) Filed: May 11, 2010

(65) Prior Publication Data

US 2010/0289446 A1    Nov. 18, 2010

(30) Foreign Application Priority Data

May 12, 2009  (KR) ........................ 10-2009-0041392

(51) Int. Cl.
*H02J 7/00*    (2006.01)
*H01M 10/44*   (2006.01)
*H01M 10/46*   (2006.01)

(52) U.S. Cl.
USPC ......................................................... 320/101

(58) Field of Classification Search ................... 320/101
See application file for complete search history.

(56) References Cited

U.S. PATENT DOCUMENTS

| | | | | |
|---|---|---|---|---|
| 5,937,229 | A  * | 8/1999 | Walgrove et al. | 399/66 |
| 5,939,855 | A  * | 8/1999 | Proctor et al. | 320/104 |
| 6,094,540 | A  * | 7/2000 | Kikuchi | 396/304 |
| 2004/0133300 | A1* | 7/2004 | Tsuboi et al. | 700/195 |
| 2008/0100258 | A1* | 5/2008 | Ward | 320/101 |
| 2009/0320827 | A1* | 12/2009 | Thompson et al. | 126/576 |

* cited by examiner

*Primary Examiner* — Arun Williams
(74) *Attorney, Agent, or Firm* — Cha & Reiter, LLC

(57) ABSTRACT

A method and apparatus provides charging information regarding devices such as a portable terminal with a solar cell. The solar cell charges the battery of the portable terminal with the highest charging efficiency at an optimal charging angle. The optimal charging angle is determined according to the location information regarding the portable terminal and time information. When the solar cell performs a charging process with the highest charging efficiency, the portable terminal provides a user with an average charging efficiency and the help containing a user's manual of the solar cell. The average charging efficiency is determined according to environmental conditions, such as temperature, humidity, weather conditions, etc.

19 Claims, 5 Drawing Sheets

METHOD AND APPARATUS FOR PROVIDING CHARGING INFORMATION REGARDING PORTABLE TERMINAL WITH SOLAR CELL

CLAIM OF PRIORITY

This application claims the benefit of priority under 35 U.S.C. §119(a) from Korean patent application No. 10-2009-0041392 filed in the Korean Intellectual Property Office on May 12, 2009, the entire disclosure of which is hereby incorporated by reference.

BACKGROUND OF THE INVENTION

1. Field of the Invention

The present invention relates to battery charging technology. More particularly, the present invention relates to a method and apparatus that provides charging information to optimize the charging efficiency when a portable terminal changes its battery using a solar cell.

2. Description of the Related Art

With the development of mobile communication technology, portable terminals now provide a variety of optional functions, such an MP3 player function, a mobile broadcast receiving function, a moving image playback function, a camera function, etc. A significant aspect of operating portable terminals providing such various functions is power usage, particularly so as not to deplete the batteries so as to hinder their use. In recent years, portable terminals have attempted to charge their battery by utilizing solar energy in order to overcome the limitation regarding the battery use time.

Solar energy technology uses the Sun's energy and light to provide heat and light. For example, a solar heating technology refers to a technology that heats water using the Sun's solar energy through housings that transfer heat to the water. A sunlight use technology also refers to a technology that converts the Sun's light to the electricity and drives a variety of devices, etc., using the electricity. Solar energy is an inexhaustible and harmless energy resource. That is, solar energy does not cause pollution to generate electricity, such as air pollution, noise pollution, greenhouse gases, vibration, etc. Solar energy can be used in virtually any area where the sunlight falls. Solar energy technology has recently been applied to portable terminals to charge their battery with solar energy. However, portable terminals adapted to use a conventional solar energy charging method have many disadvantages in that their battery charging efficiency depends on the weather conditions, time, and the sunlight intensity, and thus can be so low that a user cannot depend on being able to charge the battery.

For example, although the portable terminals utilizing a solar energy charging process for the same amount of time can have very different levels of charge, particularly if the portable terminals are exposed to different external environmental conditions, such as different weather conditions and different intensities of sunlight. The result is that as the batteries can be charged with different amounts of charge even to the same device, with such dependence on external conditions the users cannot know whether the portable terminals are charging the battery with an optimal efficiency, or how long it would take on a given day to charge the battery back to maximum power, for example.

SUMMARY OF THE INVENTION

The present invention has been made to provide a method and apparatus that provides charging information to optimize the charging efficiency when a portable terminal charges its battery using a solar cell.

In accordance with an exemplary embodiment of the present invention, the present invention provides an apparatus for providing charging information to a portable terminal, preferably including a solar cell, an RF communication unit, a controller, a storage unit, and a display unit. The solar cell converts solar energy into electricity. The RF communication unit receives location information regarding the portable terminal and time information. The controller calculates an optimal charging angle where the position of the solar cell permits the highest charging efficiency according to the location information and time information. The storage unit stores average charging efficiency information generated as average charging efficiencies, wherein the solar cell charges a battery on the average at the optimal charging angle, and which are classified according to a preset classification condition. The display unit displays at least one of the calculated optimal charging angle and the average charging efficiency. The average charging efficiency is acquired at the calculated optimal charging angle and a particular environmental condition.

In accordance with another exemplary embodiment of the present invention, the present invention provides a method for providing charging information in a portable terminal with a solar cell, including: receiving location information regarding the portable terminal and time information; and outputting the charging information corresponding to the received location information and time information, wherein the charging information includes at least one of an optimal charging angle wherein the solar cell when positioned at the optimal charging angle performs a charging process with a highest charging efficiency, and an average charging efficiency at the optimal charging angle.

BRIEF DESCRIPTION OF THE DRAWINGS

The above and other exemplary aspects, features and advantages of certain exemplary embodiments of the present invention will become more apparent from the following description taken in conjunction with the accompanying drawing, in which.

DETAILED DESCRIPTION

Figure 1:
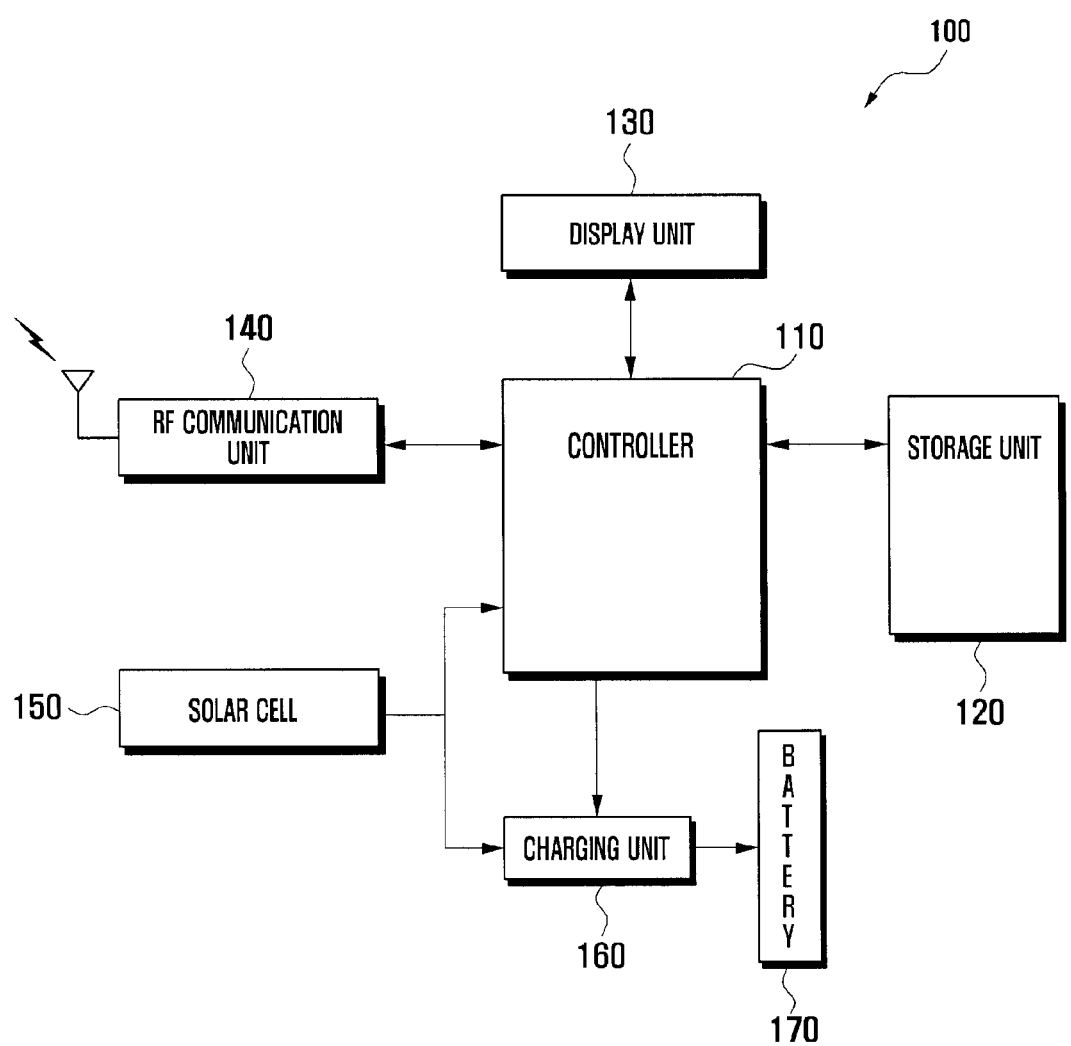
FIG. 1 is a schematic block diagram illustrating a portable terminal with a solar cell according to an exemplary embodiment of the present invention.

Hereinafter, exemplary embodiments of the present invention are described in detail with reference to the accompanying drawings. Detailed descriptions of well-known functions and structures incorporated herein may be omitted to avoid obscuring appreciation of the subject matter of the present invention by a person of ordinary skill in the art.

The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the exemplary embodiments disclosed in the description and configurations illustrated in the drawings are only preferred exemplary embodiments, and there are various modifications, alterations, and equivalents thereof the exemplary embodiments at the time of filing this application that are within the spirit of the invention and the scope of the appended claims.

In the following description, although the portable terminal according to the present invention is described based on a example of a portable terminal equipped with a solar cell, a person of ordinary skill in the art will understand and appreciate that the portable terminal is merely representative of virtually any type of information communication devices, multimedia devices, and their applications, such as, a navigation terminal, a digital broadcast receiver, a personal digital assistant (PDA), a smart phone, a portable multimedia player (PMP), an international mobile telecommunication 2000 (IMT-2000) terminal, a code division multiple access (CDMA) terminal, a wideband code division multiple access (WCDMA) terminal, a global system for mobile communication (GSM) terminal, a universal mobile telecommunication service (UMTS) terminal, etc.

Figure 2:
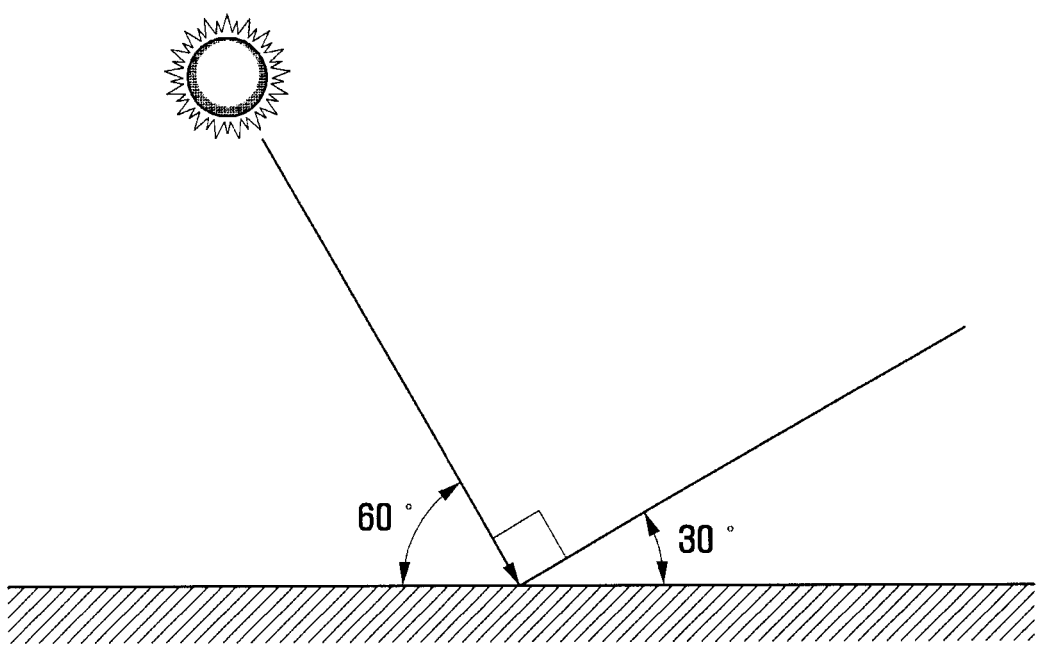
FIG. 2 is a view that illustrating a method for calculating an optimal charging angle, according to an exemplary embodiment of the present invention.

FIG. 1 is a schematic block diagram illustrating a portable terminal 100 with a solar cell according to an exemplary embodiment of the present invention, and FIG. 2 provides an operational example of a method for calculating an optimal charging angle, according to an exemplary embodiment of the present invention.

Referring now to FIGS. 1 and 2, the portable terminal 100 preferably includes a controller 110, a storage unit 120, a display unit 130, an RF communication unit 140, a solar cell 150, a charging unit 160 and a battery 170.

The solar cell 150 comprises a device that converts the energy of sunlight into electricity. The solar cell 150 falls into a solar thermal cell and a solar photovoltaic cell. The solar photovoltaic cell is, in essence, a type of p-n junction diode, and performs the photovoltaic energy conversion. In a typical solar photovoltaic cell, electrons are asymmetrically distributed. For example, a p-n junction diode is configured in such that its n-type area has a large electron density and a small hole density, and its p-type area has a small electron density and a large hole density. The p-n junction diode, formed by joining p-type and n-type semiconductors together in thermal equilibrium, causes the charge imbalance by the diffusion caused by the gradient of carrier density, which generates an electric field, so that the carrier diffusion no longer occurs. When light energy, which has energy corresponding to the difference between the conduction band and the valence band in the semiconductor material, is applied to the junction diode, the electrons receive the light energy and then excite to/from the conduction band to the valence band. The excited electrons move freely in the conduction band. On the other hand, holes are generated in the regions in the valence band from which the electrons are moved. The electrons and the generated holes, which are called transient carriers, are diffused according to the density difference in the conduction band or valence band. During the diffusion process, the majority carrier in the existing p-type or n-type semiconductor is hindered due to the energy barrier caused by the electric field, but the auxiliary carrier, generated by the diffusion, is moved to the other type of semiconductor. Therefore, the diffusion process causes the mobility of carriers, and thus the charge balance in a stable state is broken. This instability causes a potential difference. The potential difference causes an electromotive force at both ends of the p-n junction diode. As described above, the solar cell 150 preferably operates in this manner. A plurality of solar cells is connected in serial or parallel to convert the sunlight to electricity. The solar cell 150 may be formed so as to be transparent, translucent, or opaque. In an exemplary embodiment of the present invention, the solar cell 150 is installed to the body of the portable terminal 100. If the portable terminal 100 has a cover, the solar cell 150 may be formed to be translucent or opaque. Furthermore, if the solar cell 150 is installed in/on the display unit 130, the solar cell 150 may be implemented to be opaque. The solar cell 150 outputs current, where the amount of output current varies according to the sunlight intensity. In general, the solar cells for the portable terminals may output 0~150 mA according to the intensity of sunlight. The output current of the solar cell 150 flows into the charging unit 160 and then is used to charge the battery 170 of the portable terminal 100.

The charging unit 160 serves to charge the battery 170 with the electricity energy from the solar cell 150. Alternatively, the charging unit 160 also receives electrical power from an external adapter and then charges the battery 170 with the received electrical power. The charging unit 160 may further include, for example, an overcharge protection circuit.

The battery 170 may be implemented as a battery unit with various types of batteries that can be provided as a secondary battery, for example, a nickel battery, a cadmium battery, a nickel cadmium battery, a chemical battery, etc. The battery 170 is charged by the charging unit 160, and supplies electric power to the elements in the portable terminal 100.

The RF communication unit 140 preferably establishes a communication channel with a base station under the control of the controller 110 and performs data and voice communication. In an exemplary embodiment of the present invention, the RF communication unit 140 may receive location information and time information from the base station in order to calculate the optimal charging angle where the charging efficiency using the solar cell 150 is the highest. The location information refers to the latitude and longitude information regarding a place where the portable terminal is located. If the portable terminal 100 includes a GPS receiver, it may receive the location information and time information therethrough. The RF communication unit 140 may transmit the location information to a particular server (for example, a mobile communication server, a weather information providing server, etc.), and may then receive the environment information therefrom. The environment information includes the humidity, temperature, weather conditions, seasons, or the like.

The storage unit 120 preferably stores the entire operation of the portable terminal 100, application programs required to communicate with a wireless communication network, and data generated when the application programs are executed. That is, the storage unit 120 preferably stores an operating system (OS) for booting up the portable terminal 100, application programs required to operate the function of the portable terminal 100, and data generated when the portable terminal 100 is operated. The storage unit 120 can be composed of read only memory (ROM), random access memory (RAM), etc. In an exemplary embodiment of the present invention, the storage unit 120 stores a program for calculating the optimal charging angle and direction to perform an optimal charging process using the location information regarding the portable terminal 100 and the time information. The storage unit 120 may store the average charging efficiency in a database, according to a preset classification conditions, for example, weather conditions, date, time zone, seasons, etc. The average charging efficiency means a state where the solar cell 150 can perform a charging process at the optimal charging angle. Also, the storage unit 120 may also store information regarding the altitude and meridian altitude of the Sun according to the location information regarding the portable terminal 100 and time information. The meridian altitude of the Sun refers to an altitude when the Sun is located at the noon meridian. In general, the charging efficiency is the highest when the Sun passes through the meridian altitude.

Still referring to FIGS. 1 and 2, the display unit 130 displays screen data generated when the portable terminal 100 is operated and state information according to a user's key operation and function settings. The display unit 130 may also display a variety of signals and color information output from the controller 110. The display unit 130 may be implemented with a liquid crystal display (LCD), an organic light emitting diode (OLED), or any other type of thin-film screen, etc. The display unit 130 may also serve as an input device when implemented without a touch screen. In an exemplary embodiment of the present invention, the display unit 130 may display an image indicating that the battery 170 is being charged via the solar cell 150 under the control of the controller 110. For example, the display unit 130 may flicker a battery icon in the RSSI indicator area. In particular, the display unit 130 may output information regarding the optimal charging angle and direction. Also, according to the control of the controller 110, the display unit 130 displays the environmental information, so that the portable terminal 100 can select corresponding environmental information and search for an average charging efficiency according to the selected environmental information, and then output the average charging efficiency. The display unit 130 may also display the help containing the user's manual and note of the solar cell 150, etc.

The controller 110 preferably controls the entire operation of the portable terminal 100 and signal flows among the elements in the portable terminal 100. In an exemplary embodiment of the present invention, the controller 110 can calculate an optimal charging angle using location information and time information. The optimal charging angle can be calculated, for example, according to a preset period of time, a user's request, or a time that the charging efficiency is reduced to equal to or less than a preset value.

The optimal charging angle refers to an angle at which the solar cell 150 can receive the largest amount of sunlight. The optimal charging angle is calculated with respect to the surface of the Earth. That is, if the controller 110 receives a command for calculating an optimal charging angle, the location information and time information is provided to the controller preferably from a base station via the RF communication unit 140 and then the controller identifies the present altitude of the Sun based on the received location information and time information. To this end, it is preferable that information regarding the altitude of the Sun according to location information and time information is stored in the storage unit 120 of the device 100. After that, the controller 110 calculates the incident angle of the sunlight according to the altitude of the Sun, and then the optimal charging angle according to the incident angle. The incident angle of the sunlight refers to an angle between the sunlight incident on the surface of the Earth, and the surface of the Earth. The optimal charging angle refers to an angle between the surface of the Earth and the solar cell 150 when the sunlight is perpendicularly incident on the surface of the solar cell 150. As shown in FIG. 2, when the sunlight is perpendicularly incident on the surface of the solar cell 150, the solar cell 150 has the highest charging efficiency. The addition of the incident angle of the sunlight and the optimal charging angle is always 90°. For example, if the incident angle of the sunlight is 60°, the optimal charging angle is 30°. If the incident angle of the sunlight is 90°, the optimal charging angle is 30°. In particular, if the incident angle of the sunlight is 150°, the optimal charging angle is −60°. In that case, the negative sign '—' means that the direction of the sunlight incident on the surface of the Earth is changed. The optimal charging direction of the solar cell 150 refers to a direction at which the solar cell 150 directly faces the Sun. The charging direction may be determined according to the altitude of the Sun by times. After calculating an optimal charging angle, the controller 110 controls the display unit 130 to display the calculated optimal charging angle and the direction information.

The controller 110 can determine whether a charging process is being optimally performed. To this end, the controller 110 periodically detects current or voltage output from the solar cell 150 and checks the present charging efficiency, which is hereinafter called a first charging efficiency. The controller 110 receives the present time information, location information, environment information, etc. via the RF communication unit 140, and then searches for an average charging efficiency from an average charging efficiency DB stored in the storage unit 120, based on conditions closest to the received time information, location information, environmental information, etc., where the average charging efficiency is hereinafter called a second charging efficiency. After that, the controller 110 compares the first charging efficiency with the second charging efficiency to check whether or not a present charging process is being optimally performed. If the controller 110 ascertains that a present charging process is not being optimally performed, the controller 110 outputs an alert message via the display unit 130 or a voice signal to a speaker (not shown). The exemplary embodiment may be modified, for example, such that the controller 110 can further output the optimal charging angle and the direction information.

The portable terminal 100 may further include a tilt sensor (not shown) for detecting whether the portable terminal 100 is tilted. In that case, the controller 110 compares a tilt angle, output from the tilt sensor, with the optimal charging angle during the charging process. If the controller 110 ascertains that a difference between the tilt angle and the optimal charging angle is out of a preset range, it outputs a voice signal, indicating that the tilt angle of the portable terminal 100 should be corrected, to the speaker or displays an alert message showing the same content on the display unit 130.

Although not shown in FIGS. 1 and 2, the portable terminal 100 may further include many other functional modules, such as a camera module for capturing images or moving images, a short-range communication module for performing short-range RF communication, a broadcast receiver module for receiving broadcasts, a digital audio source reproducing module such as an MP3 player module, an Internet communication module for communicating with the Internet and performing an Internet function, etc. With the convergence of digital devices, there may be many digital devices and modifications thereof, not listed in the application, and, a person of ordinary skill in the art will understand and appreciate that these functional modules are just a few of the possible modules that can also be included in the portable terminal.

In the foregoing description, the configuration of the portable terminal, according to an exemplary embodiment of the present invention, has been explained. A detailed description is provided regarding a method for providing charging information regarding a portable terminal as follows.

Figure 3:
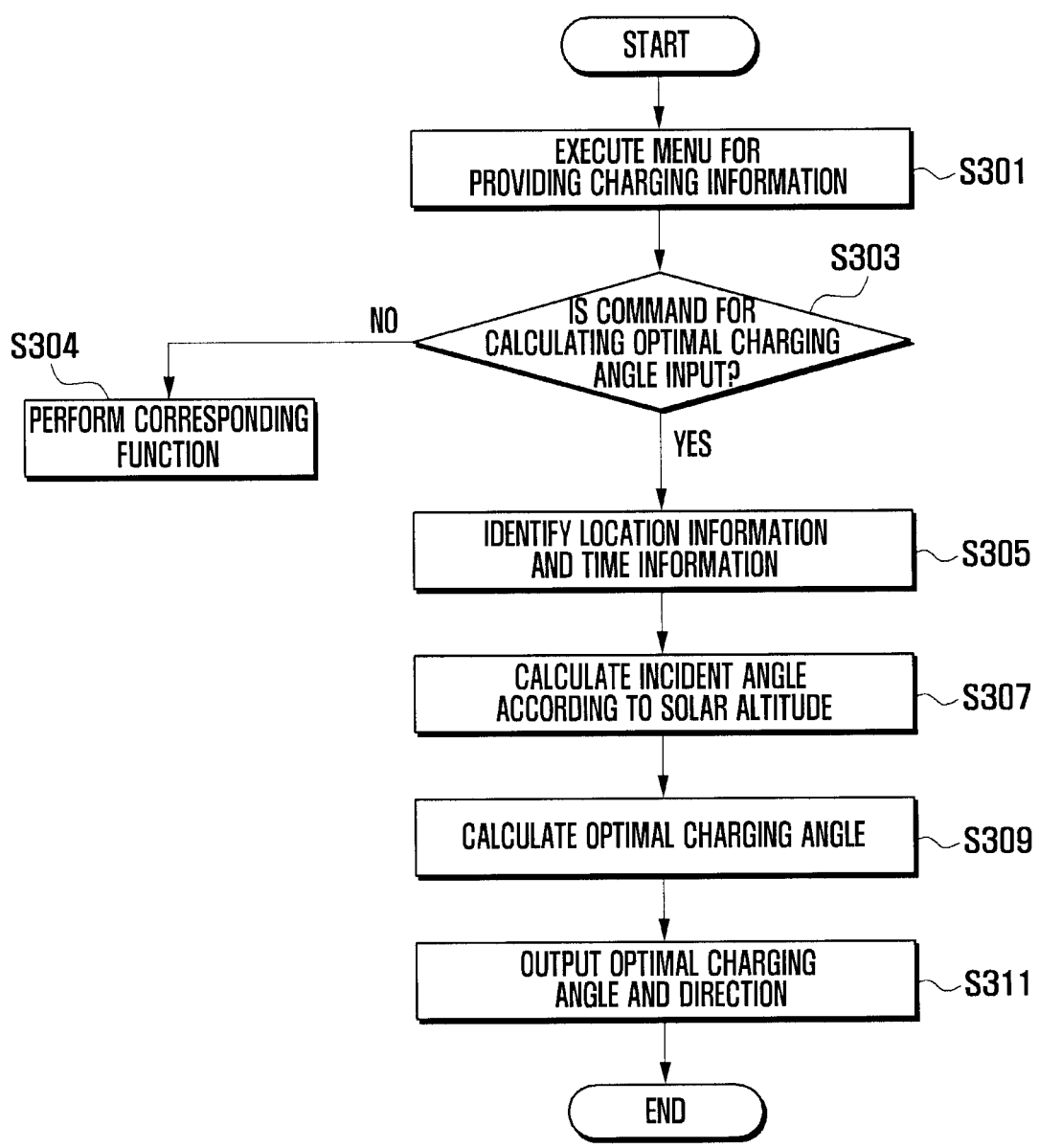
FIG. 3 is a flow chart providing an operational example of a method for providing charging information, according to an exemplary embodiment of the present invention.

FIG. 3 is a flow chart that provides an operational example of a method for providing charging information, according to an exemplary embodiment of the present invention.

Referring now to FIGS. 1 to 3, at step (S301) the controller 110 detects the execution of a menu for providing charging information. After that, at step (S303) the controller 110 checks whether a command for calculating an optimal charging angle is input. If the controller 110 ascertains that a command for calculating an optimal charging angle has not been input at S303, at step (S304) the controller performs a corresponding function. For example, the controller 110 provides the help regarding a charging function using solar energy or also an average charging efficiency according to environmental conditions, such as the weather conditions, temperature, humidity, seasons, etc. On the contrary, if the controller 110 ascertains that a command for calculating an optimal charging angle has been input at S303, then at step (S305) the controller can identify the present location information and time information. The controller 110 can receive the location information and time information from a base station via the RF communication unit 140. The location information may be latitude and longitude information. If the portable terminal 100 is implemented to include a GPS receiver, the controller can receive the location information and time information therethrough.

With continued reference to FIG. 3, the controller 110 identifies the present altitude of the Sun based on the received location information (latitude and longitude information) and the time information, and then at step (S307) calculates an incident angle of the sunlight according to the altitude of the Sun. To this end, it is preferable that the storage unit 120 store information regarding the altitude of the Sun and information regarding the location of the Sun according to the location information and time information.

At step (S309), the controller 110 calculates an optimal charging angle according to the incident angle of the sunlight. The optimal charging angle refers to an angle where the sunlight is perpendicularly incident on the surface of the solar cell 150. When the sunlight is perpendicularly incident on the surface of the solar cell 150, the solar cell 150 has the highest charging efficiency. For example, as shown in FIG. 2, if the incident angle of the sunlight is 60°, the optimal charging angle is 30°.

Next at step (S311), the controller 110 controls the display unit 130 to display the calculated optimal charging angle and direction information in the format of text and/or image. Alternatively, the controller 110 may also output the optimal charging angle and the charging direction in voice.

Although the exemplary embodiment of the present invention is described in such that information regarding the altitude and location of the Sun is stored in the storage unit 120, it should be understood that the presently claimed invention is not limited to the exemplary embodiment. For example, the exemplary embodiment may be modified in many ways including transmitting the location information regarding the portable terminal 100 to a particular server that provides the information regarding the altitude and location of the Sun, and receiving the information regarding the altitude and location information of the Sun therefrom.

Figure 4:
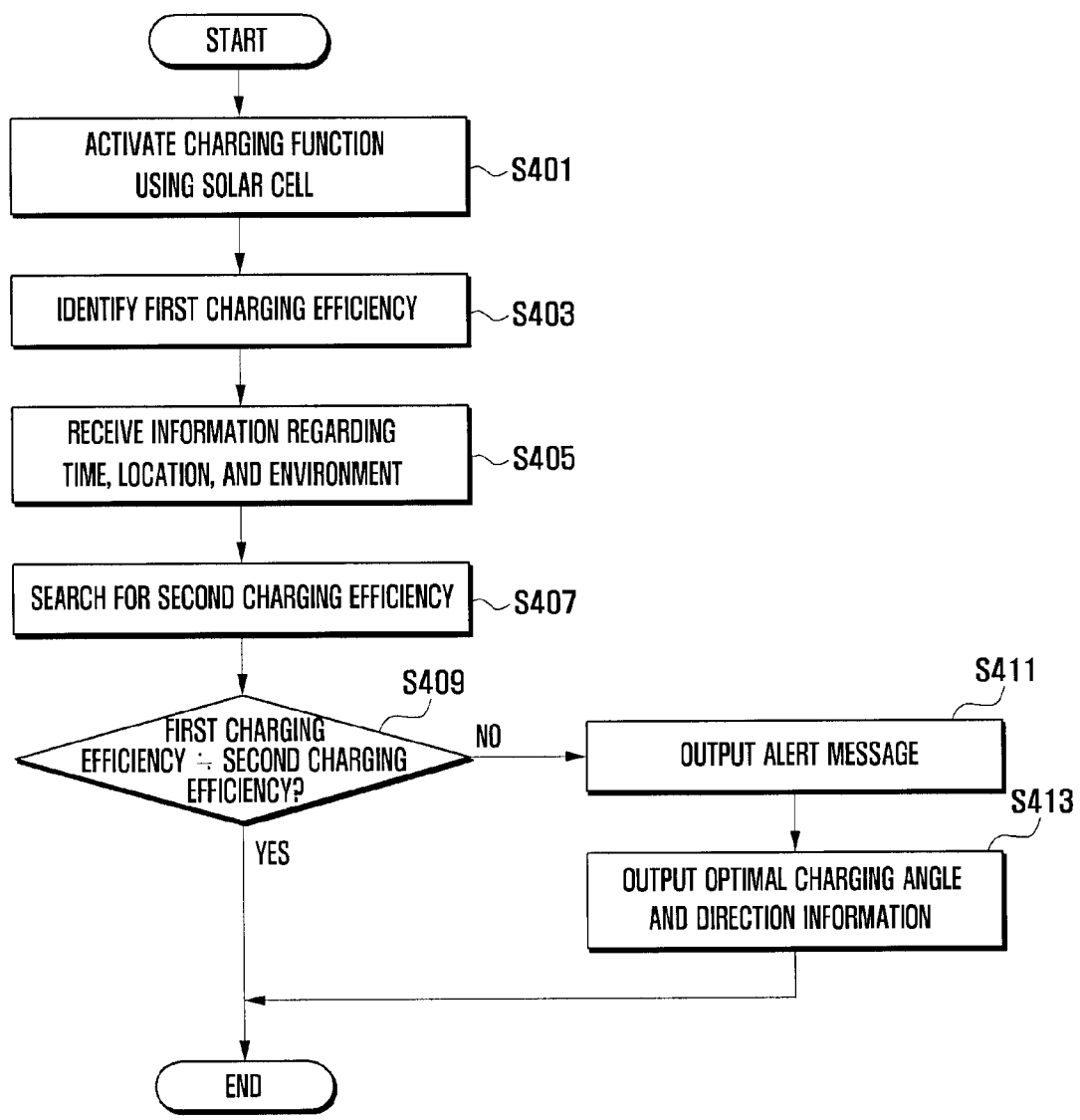
FIG. 4 is a flow chart providing an operational example of a method for providing charging information, according to another exemplary embodiment of the present invention.

FIG. 4 is a flow chart that describes a method for providing charging information, according to another exemplary embodiment of the present invention.

Referring now to FIGS. 1 to 4, at step (S401) the controller 110 activates a charging function using a solar cell 150.

At step (S403), the controller 110 identifies a charging efficiency via the solar cell 150, wherein the charging efficiency is hereinafter referred to as a first charging efficiency. That is, the controller 110 can identify the first charging efficiency via the current or voltage output from the solar cell 150. To this end, the controller 110 may include a current detector (not shown) for detecting current output from the solar cell 150 or a voltage detector (not shown) for detecting a voltage output from the solar cell 150.

At step (S405), the controller 110 receives information regarding factors that affect the charging efficiency of the solar cell 150. For example, the controller 110 receives the present time and location information from a base station via the RF communication unit 140, and also environmental information from a particular server, for example, a mobile communication server, and a weather information providing server. The environmental information contains the temperature, humidity, seasons, weather conditions, or the like.

After receiving the time information, location information, and environmental information, at step (S407)_the controller 110 searches for a charging efficiency from an average charging efficiency DB stored in the storage unit 120, based on conditions closest to the received location information, time information, environmental information, etc., where the charging efficiency is hereinafter referred to as a second charging efficiency.

Next, at step (S409) the controller 110 determines whether or not the first charging efficiency approximates to the second charging efficiency. The approximation means that the first and second charging efficiencies are equal to each other or differ within a preset range.

If at step (S409) the controller 110 ascertains that the first charging efficiency does not approximate to the second charging efficiency, then at step (S411) the controller outputs an alert message indicating that the charging efficiency is not optimal.

Alternatively, the controller 110 may output a voice signal indicating that the charging efficiency is not optimal. After that, at step (S413), the controller 110 controls the display unit 130 to output charging information that contains an optimal charging angle and direction information.

If the portable terminal 100 further includes a tilt sensor (not shown) for detecting whether the portable terminal 100 is tilted, the controller 110 compares a tilt angle output from the tilt sensor with the optimal charging angle. If the controller 110 ascertains that a difference between the tilt angle and the optimal charging angle is outside of a preset range, the controller can cause output of a voice signal to the speaker indicating that the tilt angle of the portable terminal 100 should be corrected, and/or display an alert message showing the same content on the display unit 130.

Although the exemplary embodiment of the present invention is described such that temperature or humidity information is received from a particular server, a person of ordinary skill in the art should understand that the presently claimed invention is not limited to the exemplary embodiment. For example, the embodiment may be modified, for example, to acquire temperature or humidity information from a temperature or humidity sensor if the portable terminal is implemented to include the temperature or humidity sensor.

Figure 5:
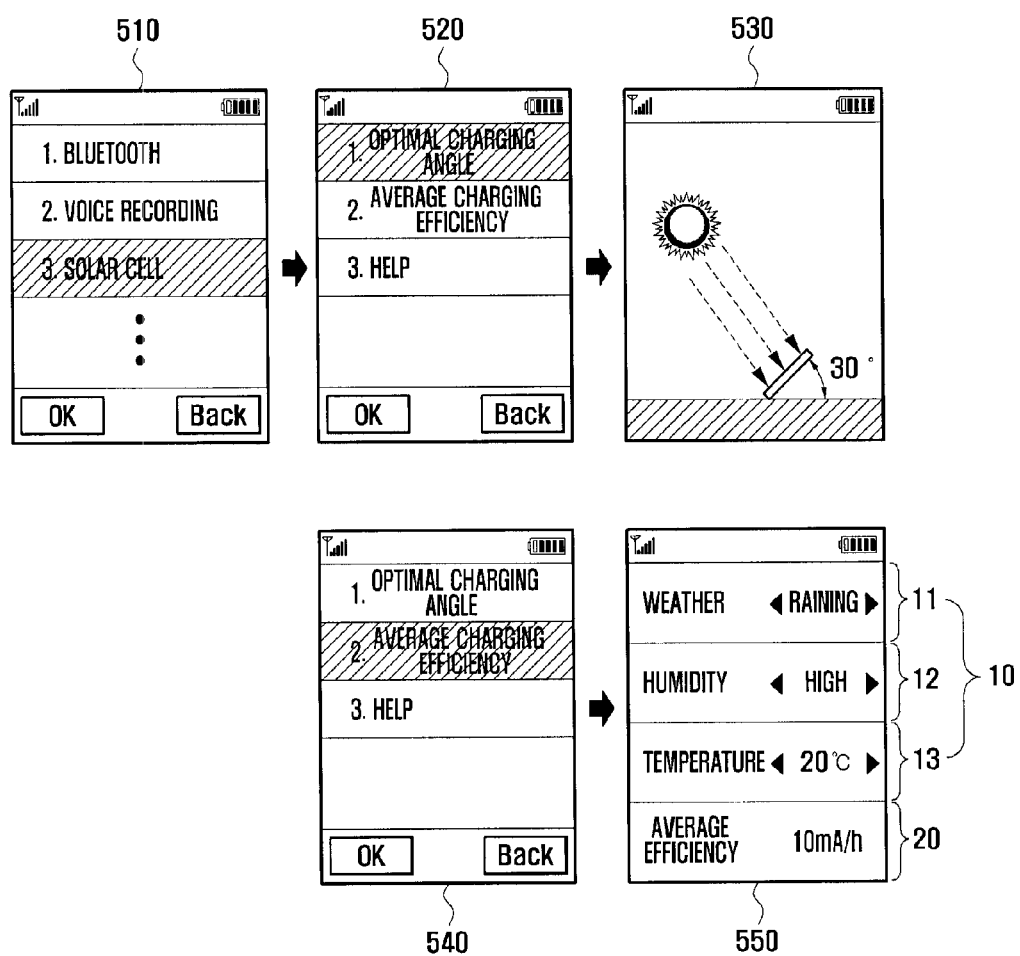
FIG. 5 illustrates screens that show a display menu for providing charging information, according to an exemplary embodiment of the present invention.

FIG. 5 illustrates screens that show a menu for providing charging information, according to an exemplary embodiment of the present invention.

Referring now to FIGS. 1 and 5, the portable terminal 100 displays a menu of a plurality of items on a first screen 510 of the display unit 130. When a user selects an item 'Solar cell', its sub-menu preferably displays sub-items, '3. Optimal charging angle', 'Average charging efficiency', and 'Help', on a second screen 520 of the display unit 130. If the user selects a sub-item, '1. Optimal charging angle', on the second screen 520, the controller 110 calculates an optimal charging angle and controls the display unit 130 to display the calculated optimal charging angle in the format of text and/or image on a third screen 530. Since the method for calculating the optimal charging angle has been already explained in the foregoing description referring to FIG. 3, its explanation will be omitted in the following description.

On the other hand, if the user select a sub-item, '2. Average charging efficiency' on a fourth screen 540, the display unit 130 displays a fifth screen 550 showing Weather, Humidity, Temperature, Average efficiency, etc. The fifth screen 550 is distinguished between an environmental selection area 10 and a charging efficiency output area 20 that outputs an average charging efficiency according to the selected environmental factor. The environmental selection area 10 a weather region 11 for selecting weather conditions, a humidity region 12 for selecting humidity, and a temperature area for selecting temperature. The user can set weather, humidity and temperature conditions on the environmental region 10 to identify a charging efficiency in a particular environment. For example, if the user selects 'Rain' in the weather region 11, 'High' in the humidity region 12, and 20° C. in the temperature region 13 on the fifth screen 550, the display unit 130 displays an average charging efficiency of 10 mA/h in the charging efficiency output area 20 on the fifth screen 550. In other words, the portable terminal 100 charges the battery with current 10 mA per hour, using the solar cell 150. To this end, it is preferable that that the storage unit 120 store average charging efficiencies, according to temperature, weather conditions, humidity, time, and seasons, in a database.

Although not shown in FIG. 5, if the user selects a sub-item 'Help' on the second screen 520, the display unit 130 may display brief information, note, and user's manual regarding the solar cell 150 and the charging process thereof.

As stated previously, although the exemplary embodiments of the present invention is explained in implementation to display an optimal charging angle and direction information on the display unit, a person of ordinary skill in the art should understand that the presently invention is not limited to any of the exemplary embodiments. For example, the exemplary embodiments may be modified so that the optimal charging angle and direction information can be transmitted to a cradle holding the portable terminal 100, through wireless or wired communication. The cradle can manually or automatically adjust the direction or angle of the portable terminal held thereby. That is, the cradle receives the optimal charging angle and direction information and then adjusts the direction or angle of the portable terminal held thereby, according to the received information. The cradle automatically adjusts the angle and direction of the portable terminal held thereby, according to the change in the incident angle of the sunlight, so that the sunlight can be perpendicularly incident on the surface of the solar cell of the portable terminal. Therefore, the portable terminal with a solar cell, according to the present invention, retains the highest charging efficiency.

As described above, the method and apparatus according to the present invention provides an optimal charging angle, so that the portable terminal with a solar cell can perform a charging process with the highest charging efficiency and thus reduce the battery charging time. The claimed invention also provides the average amount of battery to be charged according to the environmental conditions, such as temperature, weather conditions, humidity, seasons, etc., thereby making it easier to recognize the battery charging state.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with respect to exemplary embodiments thereof, it should be understood that these exemplary embodiments are only illustrative and not intended to limit the scope of the claimed invention. Therefore, one skilled in the art will understand that the embodiments disclosed in the description and configurations illustrated in the drawings are only preferred exemplary embodiments, instead there may be various modifications, alterations, and equivalents thereof, without departing from the scope and spirit of the presently claimed invention as described in the accompanying claims.

What is claimed is:

1. A method for providing charging information in a portable terminal with a solar cell, comprising:
   receiving at least one of location information, time information regarding a portable terminal and environmental information containing at least one of the temperature, humidity, seasons and weather conditions;
   outputting charging information corresponding to the at least one of the received location information, time information and the environmental information,
   wherein the charging information comprises at least one of an optimal charging angle wherein the solar cell performs a charging process with a highest charging efficiency, or an average charging efficiency at the optimal charging angle;
   monitoring the optimal charging angle by comparing a tilt angle output from a tilt sensor, with the optimal charging angle; and
   outputting, if a difference between the tilt angle and the optimal charging angle is outside a preset range, a voice signal or an alert message indicating that the tilt angle of the portable terminal should be corrected.

2. The method of claim 1, wherein charging information includes a help function containing a user's manual of the solar cell.

3. The method of claim 1, wherein charging information is generated based on the received location information and time information.

4. The method of claim 1, wherein the charging information is extracted for output by detecting an altitude of the Sun according to the location information and time information;
   calculating an incident angle of the sunlight according to the altitude of the Sun; and calculating an optimal charging angle, where the sunlight is perpendicularly incident on the solar cell, and direction information.

5. The method of claim 4, further comprising:
transmitting the optimal charging angle and the direction information to a cradle holding the portable terminal, so that the cradle manually or automatically adjusts a direction and angle of the portable terminal.

6. A method for providing charging information in a portable terminal with a solar cell, comprising:
receiving location information and time information regarding a portable terminal; and
outputting charging information corresponding to the received location information and time information;
receiving environmental information containing at least one of the temperature, humidity, seasons and weather conditions; and
periodically identifying a charging efficiency of the solar cell;
searching for an average charging efficiency, based on a condition closest to the environmental information, time information, and location information, from average charging efficiency information, wherein the average charging efficiency information is generated as average charging efficiencies at the optimal charging angle are classified by date, weather conditions, seasons, and time;
comparing the identified charging efficiency of the solar cell with the searched average charging efficiency; and
notifying a user that the identified charging efficiency is less than the searched average charging efficiency, if the identified charging efficiency is less than the searched average charging efficiency.

7. The method of claim 6, wherein notifying a user comprises:
outputting an indication that the charging efficiency is not optimized.

8. The method of claim 7, wherein the indication comprises a message or a voice signal.

9. The method of claim 6, wherein notifying a user comprises:
outputting the optimal charging angle and direction information.

10. An apparatus for providing charging information to a portable terminal, comprising:
a solar cell for converting solar energy into electricity;
an RF communication unit for receiving location information regarding the portable terminal and time information;
a controller for calculating an optimal charging angle at which the solar cell is positioned for a highest charging efficiency based on the received location information and time information;
a storage unit for storing average charging efficiency information generated as average charging efficiencies, wherein the solar cell charges a battery on the average at the optimal charging angle, and which are classified according to a preset classification condition; and
a display unit for displaying at least one of the calculated optimal charging angle and the average charging efficiency, wherein the average charging efficiency is acquired at the calculated optimal charging angle and a particular environmental condition.

11. The apparatus according to claim 10, wherein the display unit displays a help screen containing a user's manual of the solar cell.

12. The apparatus of claim 10, wherein the controller identifies an altitude of the Sun using the location information and time information, and calculates an incident angle of the sunlight according to the altitude of the Sun, and the optimal charging angle and direction information when the sunlight is perpendicularly incident on the solar cell.

13. The apparatus of claim 12, wherein the controller controls the display unit to display the optimal charging angle and direction information in at least one of the formats of text, voice, and image.

14. The apparatus of claim 12, wherein the controller transmits the optimal charging angle and direction information to a cradle that manually or automatically adjusts the angle and direction of the portable terminal for optimal charging.

15. The apparatus of claim 10, wherein the RF communication unit receives environmental information that contains at least one of temperature, humidity, seasons, and weather conditions.

16. The apparatus of claim 15, wherein the controller:
periodically identifies a charging efficiency of the solar cell; searches for an average charging efficiency, based on condition closest to the environmental information, time information, and location information, received via the RF communication unit, from average charging efficiency information; compares the searched average charging efficiency with the identified charging efficiency; and if the identified charging efficiency is less than the searched average charging efficiency, outputs an alert message or a voice signal indicating that the identified charging efficiency is less than the searched average charging efficiency.

17. The apparatus of claim 16, wherein, if the identified charging efficiency is less than the searched average charging efficiency, the controller outputs the optimal charging angle and direction information.

18. The apparatus of claim 10, further comprising:
a tilt sensor for detecting whether the portable terminal is tilted from a predetermined orientation.

19. The apparatus of claim 18, wherein the controller:
compares a tilt angle, output from the tilt sensor, with the optimal charging angle; and, if a difference between the tilt angle and the optimal charging angle is outside a preset range, outputs a voice signal or an alert message indicating that the tilt angle of the portable terminal should be corrected.

* * * * *